US008767718B2

(12) United States Patent
Forbes et al.

(10) Patent No.: US 8,767,718 B2

(45) Date of Patent: Jul. 1, 2014

(54) CONVERSATION DATA ACCURACY CONFIRMATION

(75) Inventors: Scott C. Forbes, Seattle, WA (US); Linda Criddle, Kirkland, WA (US); David Milstein, Redmond, WA (US); Lon-Chan Chu, Redmond, WA (US); Kuansan Wang, Bellevue, WA (US); David A. Howell, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1263 days.

(21) Appl. No.: 11/559,882

(22) Filed: Nov. 14, 2006

(65) Prior Publication Data

US 2008/0114594 A1 May 15, 2008

(51) Int. Cl.

| | |
|---|---|
| ***H04L 12/66*** | (2006.01) |
| ***G06F 3/16*** | (2006.01) |
| ***G06F 3/00*** | (2006.01) |
| ***H04M 7/00*** | (2006.01) |

(52) U.S. Cl.

CPC ........ *H04M 7/006* (2013.01); *H04M 2203/252* (2013.01)

USPC ............ 370/356; 715/727; 715/728; 715/729

(58) Field of Classification Search

None

See application file for complete search history.

(56) References Cited

U.S. PATENT DOCUMENTS

| | | | | |
|---|---|---|---|---|
| 6,904,132 | B2 | 6/2005 | Reynolds | |
| 2002/0091517 | A1* | 7/2002 | Frank et al. | 704/231 |
| 2006/0009973 | A1* | 1/2006 | Nguyen et al. | 704/257 |
| 2006/0067308 | A1 | 3/2006 | Cho | |
| 2006/0153357 | A1* | 7/2006 | Acharya et al. | 379/266.01 |

OTHER PUBLICATIONS

C. Eccher, L. Eccher, D. Falavigna, L. Nardelli, M. Orlandi, A. Sboner, On the Usage of Automatic Voice Recognition in an Interactive Web Based Medical Application, pp. 1-4, Apr. 10, 2003.*

K. Singh, A. Nambi, H. Schulzrinne, Integrating VoiceXML with SIP services, Conference Record of the International Conference on Communications, May 2003, pp. 784-788.*

* cited by examiner

*Primary Examiner* — John Blanton

*Assistant Examiner* — Christopher Crutchfield

(74) *Attorney, Agent, or Firm* — Steven Spellman; Jim Ross; Micky Minhas

(57) ABSTRACT

The present invention generally relates to a method and system for providing VoIP clients with the ability to confirm accuracy in conversation data over a digital communication channel. More specifically, a method and system is provided for verifying, via a visual representation whether a receiving client captures accurate information from a particular portion of the digital voice conversation. In response to a triggering event, a visual representation, including information extracted from the particular portion of the digital voice conversation, may be generated for verifying the accuracy. Based on the needs of the clients engaging in the conversation, one or more visual representations and corresponding verifications can be exchanged. In this manner, a multi-tiered oral agreement with authentication may be generated over a digital communication channel.

20 Claims, 20 Drawing Sheets

100
VOIP CLIENT
104
ISP
106
PSTN
112
PSTN INTERFACE
114
IP DATA NETWORK
108
VOIP SERVICE PROVIDER
140
ISP
122
124
125
126
VOIP SERVICE PROVIDER
132
LAN
136
134

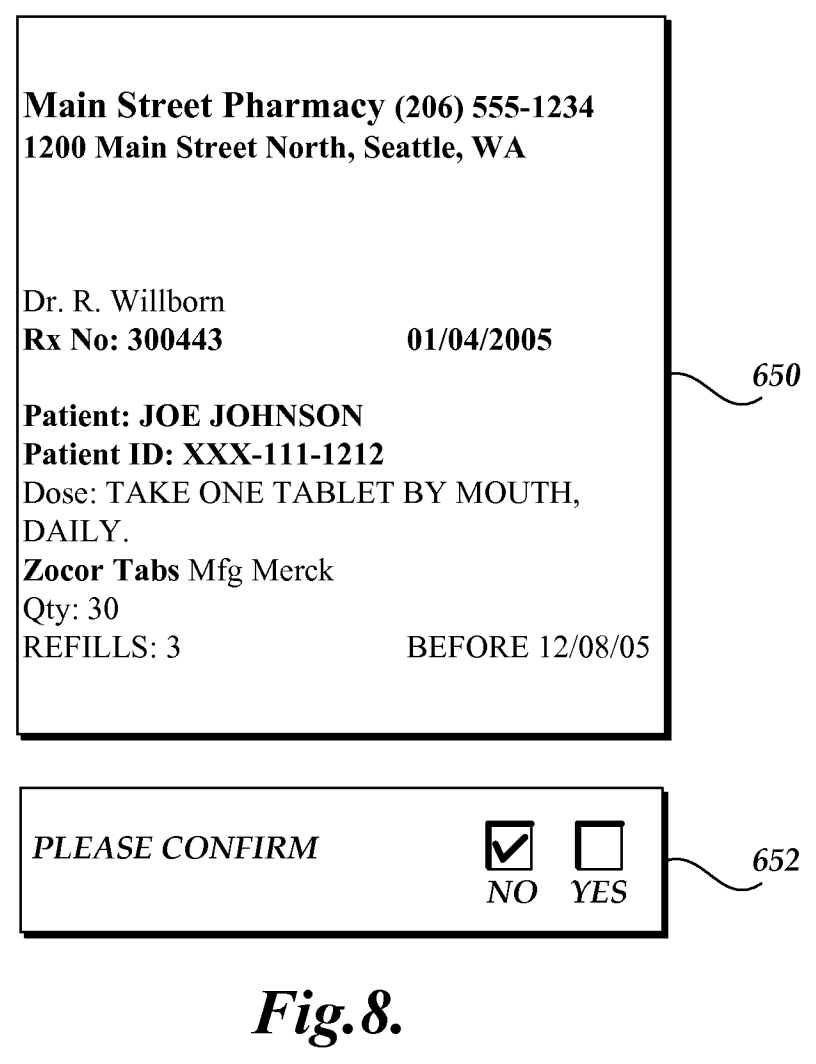

650

Main Street Pharmacy (206) 555-1234
1200 Main Street North, Seattle, WA

Dr. R. Willborn
Rx No: 300443 01/04/2005

Patient: JOE JOHNSON
Patient ID: XXX-111-1212
Dose: TAKE ONE TABLET BY MOUTH, DAILY.
Zocor Tabs Mfg Merck
Qty: 30
REFILLS: 3 BEFORE 12/08/05

652

*PLEASE CONFIRM*
*NO* *YES*

*Fig.8.*

CONVERSATION DATA ACCURACY CONFIRMATION

BACKGROUND

Generally described, an Internet telephony system provides an opportunity for users to have a call connection with enhanced calling features compared to a conventional Public Switched Telephone Network (PSTN) based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, current VoIP approaches may not provide a user with the ability to confirm accuracy in their voice commands, such as a verbal purchase order, while the user is still engaged in a VoIP conversation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a method for providing a visual representation corresponding to part of a digital voice conversation is provided. The method includes extracting information from part of a digital voice conversation and generating a visual representation with the extracted information. Additional information necessary to generate the visual representation may be obtained. In accordance with a set of rules which specifies a visual representation corresponding to the part of a digital voice conversation, a visual representation is generated based on the extracted information and the additional information. The generated visual representation is transmitted as part of contextual information over a digital voice conversation channel. Subsequently, a response to the transmitted visual representation is received and upon receipt of the response, the visual representation is verified as to whether it is accurate, or inaccurate.

In accordance with another aspect of the present invention, a system for providing a confirmation message in voice commands is provided. The system comprises a communication interface component, a processing component and a confirmation generating component. After the communication interface component receives a voice command to be confirmed, the processing component identifies a set of rules relating to the voice command and parses the voice command based on the set of rules. Additional information relating to the digital conversation may be obtained and a confirmation message, including the extracted information and the additional information, is generated. The communication interface component transmits the generated confirmation message as part of contextual information over the digital conversation. Various responses to the transmitted confirmation message may be received and appropriate actions are performed. For example, if verification is received as a response, the confirmation message and the voice command are stored in local storage.

In accordance with yet another aspect of the present invention, a method for verifying at least a portion of conversation data is provided. A confirmation request to receive a visual representation in the portion of the conversation data is generated and transmitted as part of contextual information. After transmitting the portion of the conversation data, a visual representation corresponding to the conversation data is received within a predetermined time and verified whether the visual representation accurately represents the conversation data. A response to the visual representation is generated accordingly and transmitted.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is a pictorial diagram depicting an exemplary screen of a visual representation for a client to verify accuracy of the exchanged conversation in accordance with an aspect of the present invention;

DETAILED DESCRIPTION

Generally described, embodiments of the present invention relate to a method and system for providing the ability to confirm accuracy in conversation data over a digital communication channel. More specifically, embodiments of the present invention relate to a method and system for verifying, via a visual representation, whether a receiving party has captured correct information from the particular digital conversation data over a digital communication channel such as a VoIP communication channel. In response to a triggering event, a visual representation, including information extracted from the received digital conversation data, may be generated for verifying the accuracy of the captured information. The scope of the information to be extracted may be governed by a set of rules, the needs of the parties engaging in a digital voice conversation, or the like. Further, based on the need of the parties engaging in the digital voice conversation, one or more visual representations and corresponding verifications can be exchanged. In this manner, a tiered oral agreement with authentication may be generated over a digital communication channel.

In an aspect of the invention, the digital voice conversation, such as a VoIP conversation, includes one or more data streams of information related to a conversation, such as contextual information and voice/multimedia information, exchanged over a conversation channel. For example, the visual representation is transmitted as part of contextual information which is defined in accordance with its corresponding "structured hierarchies." "Structured hierarchies," as used herein, are predefined organizational structures for arranging contextual information to be exchanged between two or more VoIP devices. For example, structured hierarchies may be eXtensible Markup Language (XML) namespaces. Although the present invention will be described with relation to illustrative structured hierarchies and an IP telephony environment with an emphasis on voice communication, one skilled in the relevant art will appreciate that the disclosed embodiments are illustrative in nature and should not be construed as limiting.

Figure 1:
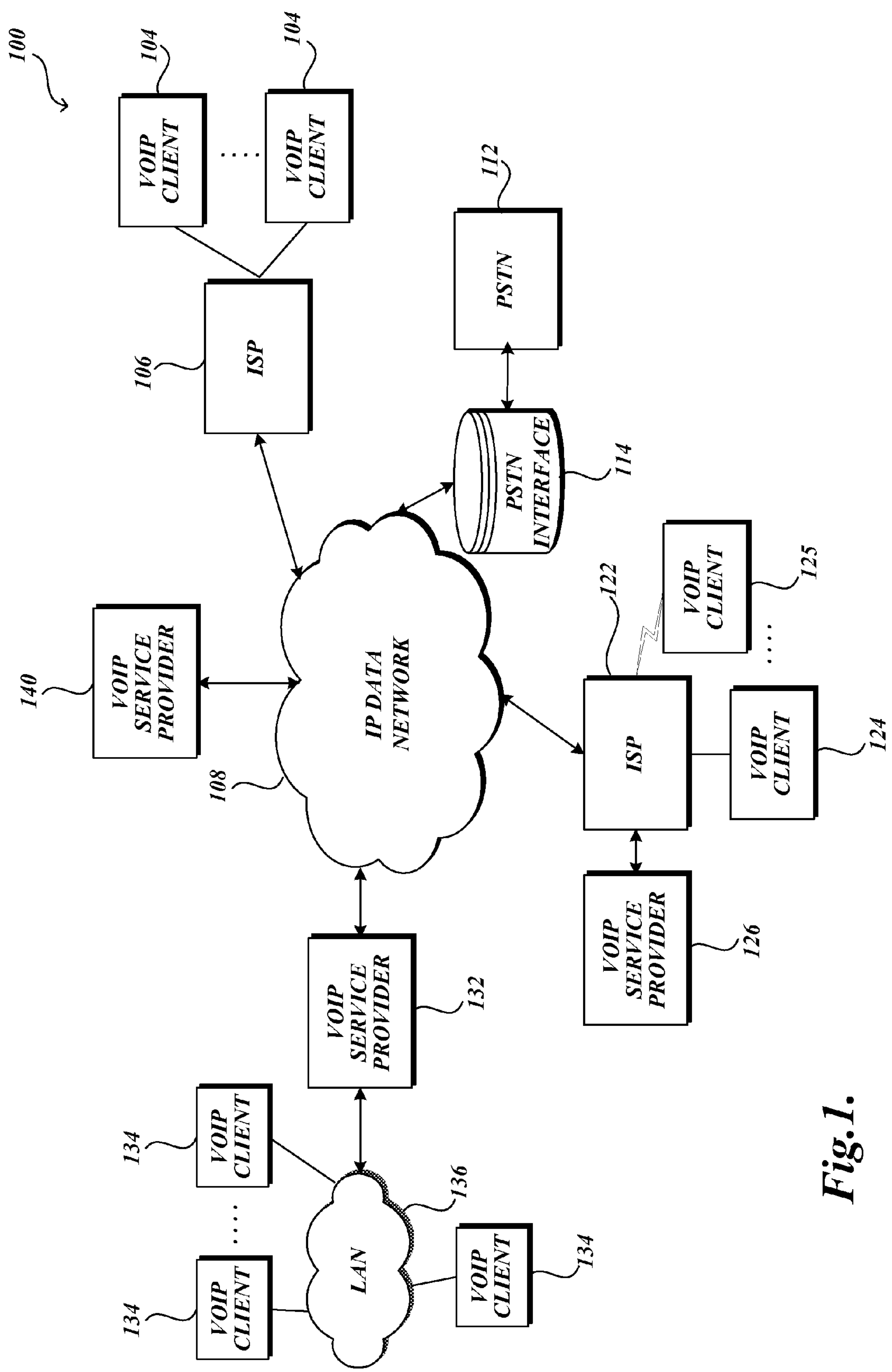
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a roBOT (BOT), a company, etc., one or more associated VoIP devices and a unique VoIP client identifier. For example, a single individual, five associated VoIP devices and a unique VoIP client identifier collectively make up a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN), and the like. The IP telephony environment 100 may further include VoIP service providers 126, 132 providing VoIP services to VoIP clients 124, 125, 134. A VoIP conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP conversation. VoIP clients 104, 124, 125, 134 may create, maintain, and provide information relating to predetermined priorities for incoming calls.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with the PSTN 112. A PSTN interface 114 such as a PSTN gateway may provide access between PSTN 112 and the IP data network 108. The PSTN interface 114 may translate VoIP data packets into circuit switched voice traffic for PSTN 112 and vice versa.

Conventional voice devices, may request a connection with the VoIP client based on the unique VoIP identifier of that client, and the appropriate VoIP device associated with the VoIP client will be used to establish a connection. In one example, an individual associated with the VoIP client may specify which devices are to be used in connecting a call based on a variety of conditions (e.g., connection based on the calling party, the time of day, etc.).

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
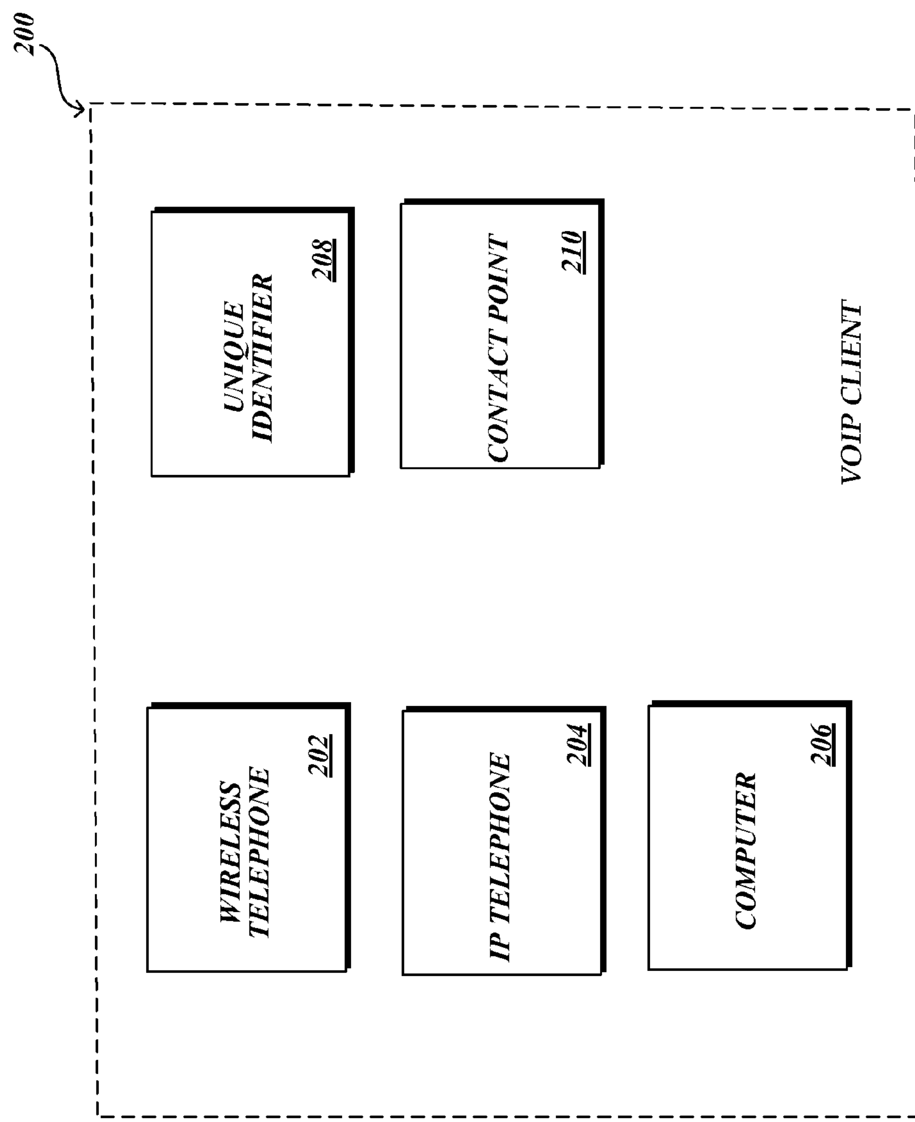
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique VoIP identifiers 208. The unique VoIP identifier(s) 208 may be constant or change over time. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In an alternative embodiment, the VoIP client 200 may maintain multiple VoIP identifiers where a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
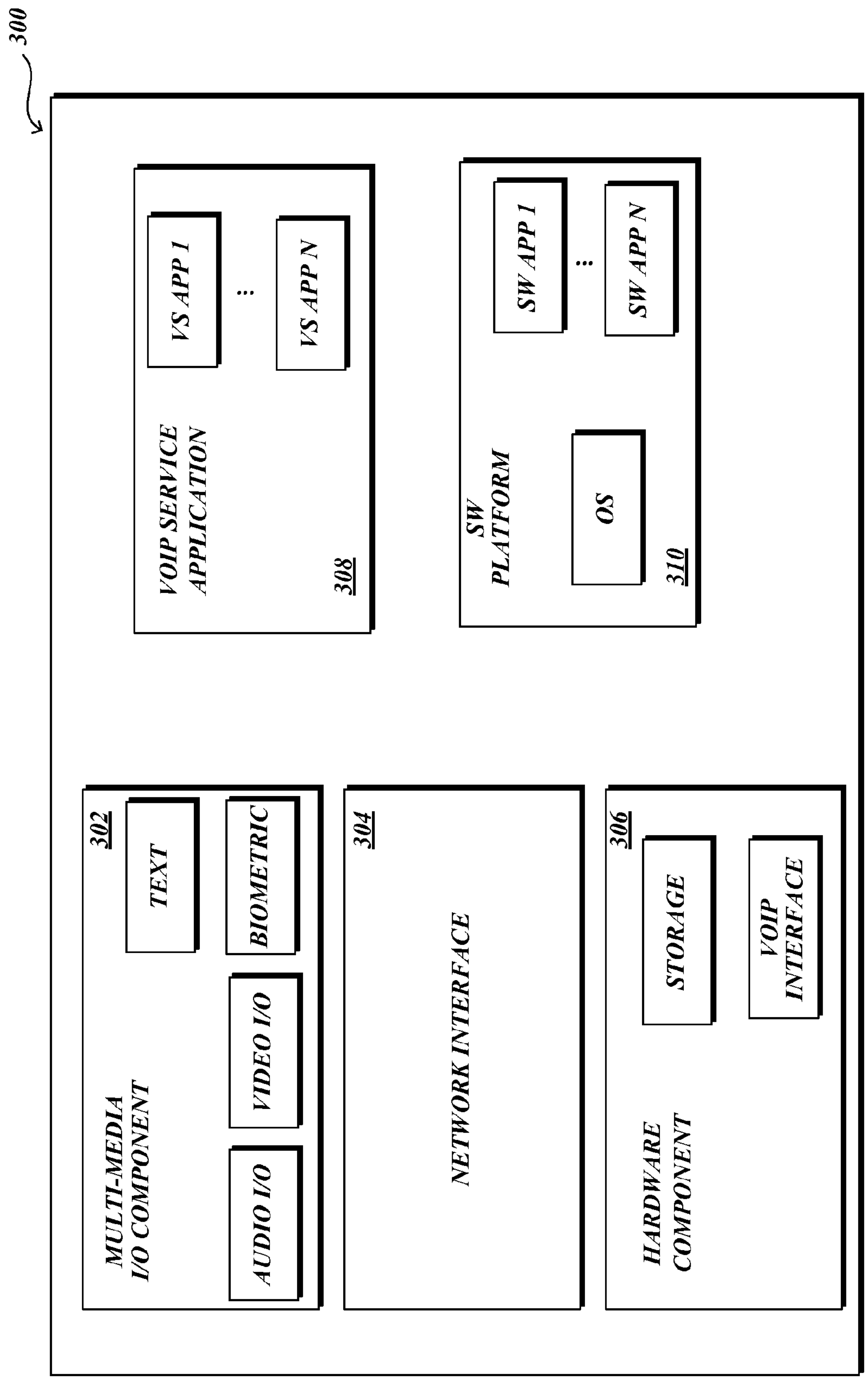
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304.

The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, etc.) associated with the VoIP client in which the device is included. In one embodiment, the hardware component 306 may include a VoIP interface card which allows a non-VoIP client device to transmit and receive a VoIP conversation.

The device 300 may further include a software platform component 310 for the operation of the device 300 and a VoIP service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4:
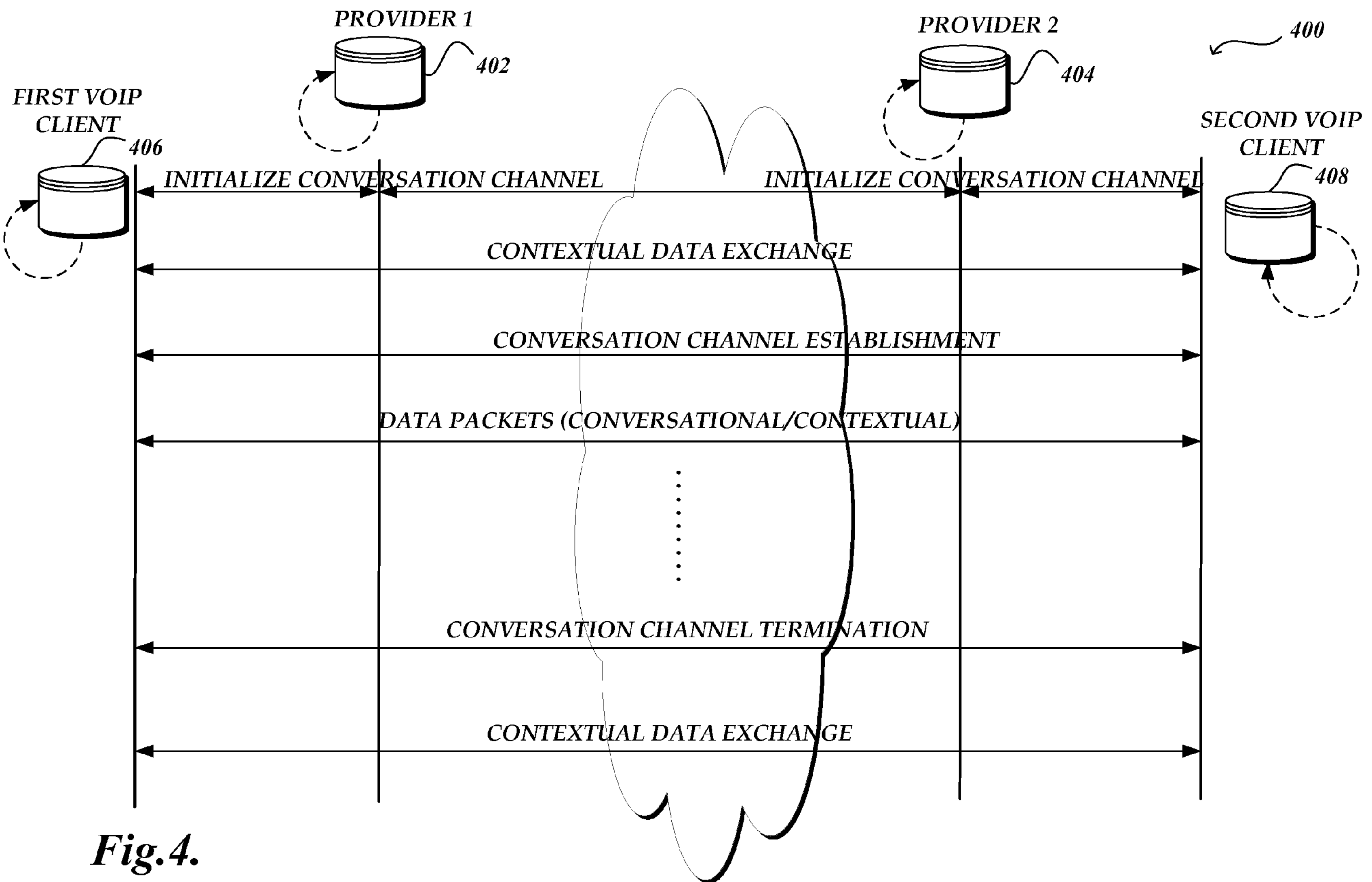
FIG. 4 is a block diagram illustrative of the exchange of data between two VoIP clients over a conversation channel in accordance with an aspect of the present invention.
Figure 5:
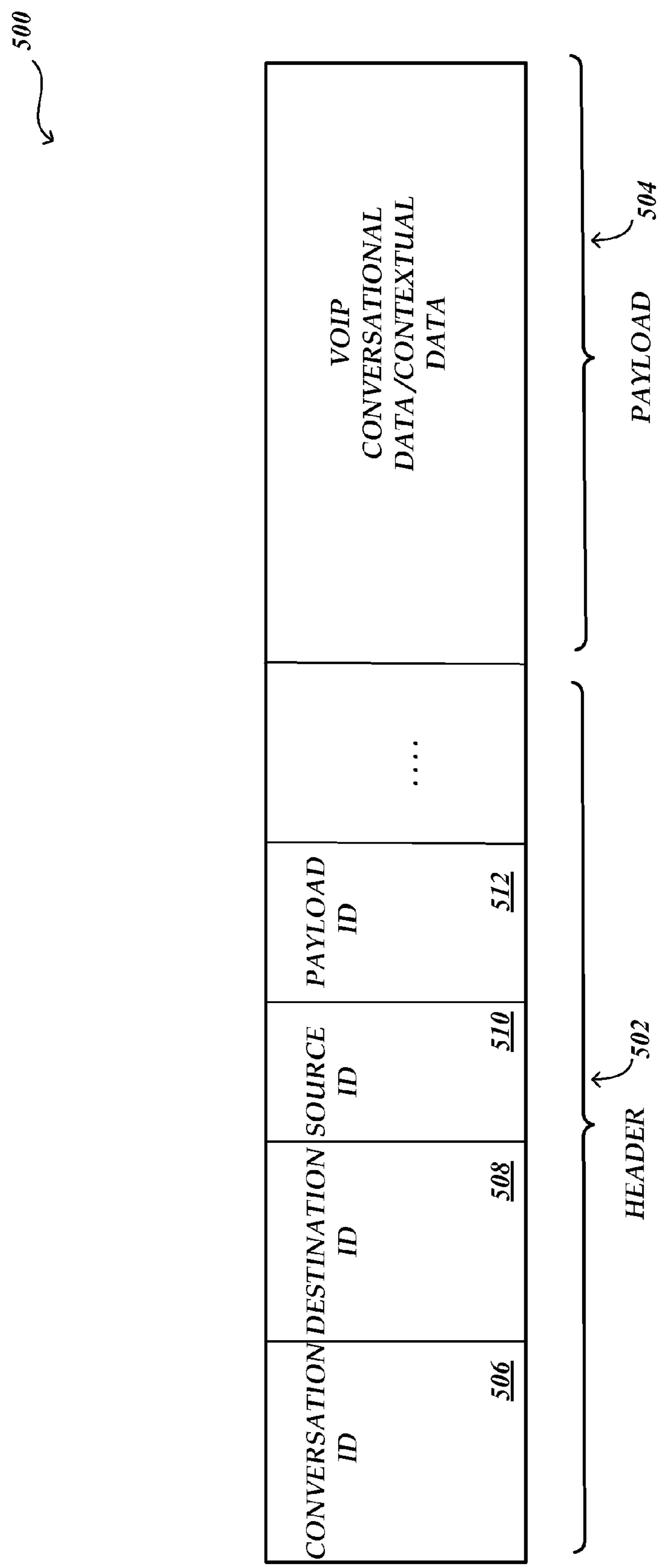
FIG. 5 is a block diagram of a data packet used over a communication channel established in the VoIP environment of FIG. 1.
Figure 6:
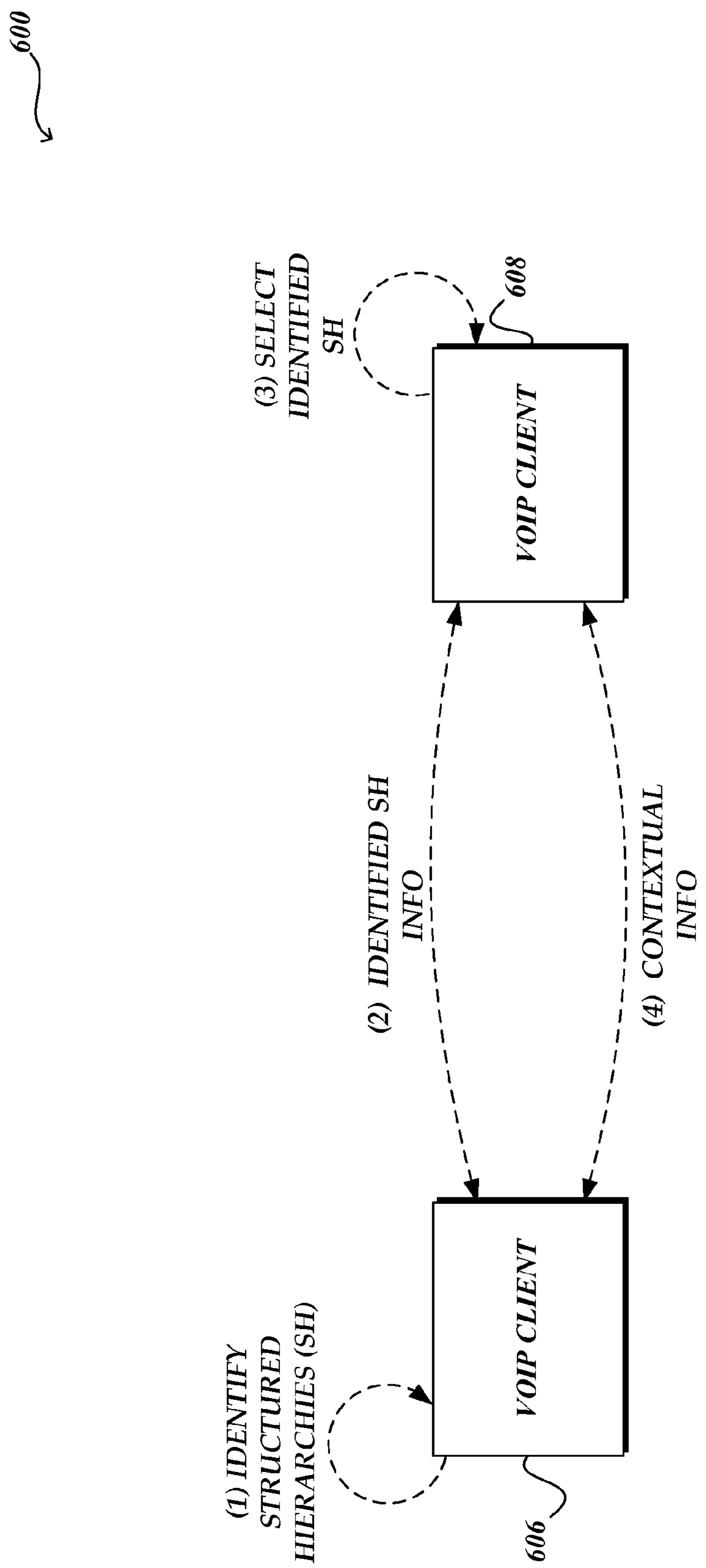
FIG. 6 is a block diagram illustrating interactions between two VoIP clients for transferring contextual information defined by identified structured hierarchies in accordance with an aspect of the present invention.

It is to be noted that FIGS. 4, 5, and 6 are depicted herein to discuss general VoIP conversation channel implementations which are utilized when a portion of a conversation to be confirmed is transmitted as part of a VoIP conversation, or when information necessary for generating a visual representation of the portion of the conversation is exchanged as part of contextual information.

With reference to FIG. 4, a block diagram illustrative of a conversation flow 400 between VoIP devices of two different VoIP clients over a conversation channel in accordance with an embodiment of the present invention is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 408. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer-to-peer context, communication between VoIP devices may also be direct without having any service providers involved.

There is a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over a Real-Time Transport Protocol (RTP) path/channel. For the purpose of discussion, a communication channel, as used herein, generally refers to any type of data or signal exchange path/channel. Thus, it will be appreciated that, depending on the protocol, a connection set-up phase and a connection termination phase may require additional steps in the conversation flow 400.

For ease of explanation, we will utilize the example in which the first VoIP client 406 and the second VoIP client 408 each include only one VoIP device. Accordingly, the discussion provided herein will refer to connection of the two VoIP devices. The individual using the device of the first VoIP client 406 may select or enter the unique identifier of the client that is to be called. Provider 1 402 receives the request from the device of the first VoIP client 406 and determines a terminating service provider (e.g., Provider 2 404 of the second VoIP client 408) based on the unique client identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. For example, contextual information may include the access information of a particular electronic document so that the first VoIP client 406 and the second VoIP client 408 can access the electronic document during the conversation. As will be discussed in greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client (e.g., the first VoIP client 406), the device, and the VoIP client (e.g., the second VoIP client 408) being called. For example, the contextual information sent from the called VoIP client may include a visual representation of a voice command (e.g., a purchase order, a binding document, a verbal prescription, etc.) received from the calling VoIP client. In this way, the calling VoIP client can easily verify via the visual representation (e.g., a text message summarizing the voice command) whether the called VoIP client has accurately received the voice command. Subsequently, the calling VoIP client may complete the voice command or retransmit the voice command.

Available media types, rules of the calling client, the client being called, and the like may also be part of the contextual information that is exchanged during the connection set-up phase. For example, a set of rules indicates that a visual representation in conversation data will be required under specified conditions. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying the type of payload (e.g., conversation or contextual), individual ID (not shown) for identifying the individual to which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

As will be discussed in greater detail in FIGS. 13A-13E, in one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), a set of rules specifying about a visual representation and corresponding response, a scope of content in a visual representation, etc. More specifically, the contextual information may include client preference, client rules, client's location (e.g., user location, device location, etc.), biometrics information, the client's confidential information, VoIP device's functionality, VoIP service provider's information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete the VoIP client's contextual data before forwarding the contextual information. For example, the client's confidential information will be deleted by the VoIP service provider associated with that client unless the client authorizes such information to be transmitted. In some cases, a minimal amount of contextual information is transmitted outside of an intranet network.

With reference to FIG. 6, a block diagram 600 illustrating interactions between two VoIP clients for transferring contextual information, in accordance with an embodiment of the present invention, is shown. As with FIG. 4, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information identifying which structured hierarchy will be used to carry the contextual information, VoIP Client 606, 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be exchanged between VoIP Client 606 and VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchies, VoIP Client 606, 608 is expecting to receive a data stream such that data packets corresponding to the data stream are defined according to the identified structured hierarchies. VoIP Client 606,608 can begin sending contextual information represented in accordance with the identified structured hierarchies. In one embodiment, upon receipt of the contextual information, VoIP Client 606, 608 starts a data binding process with respect to the contextual information. For example, instances of the identified structured hierarchies may be constructed with the received contextual information.

Figure 7A:
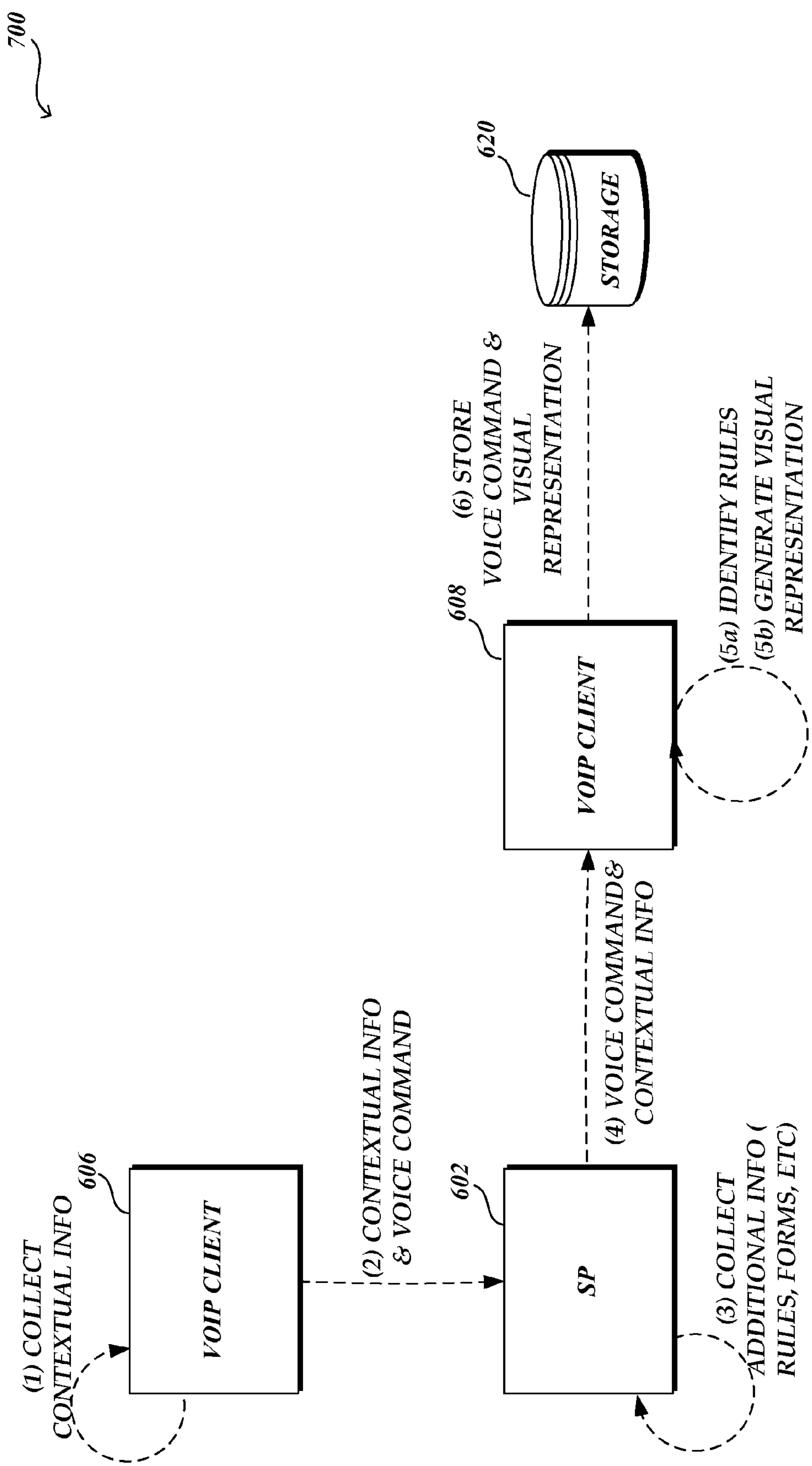
FIGS. 7A and 7B are block diagrams illustrating interactions between two clients for verifying accuracy of the exchanged conversation in accordance with an aspect of the present invention.
Figure 7B:
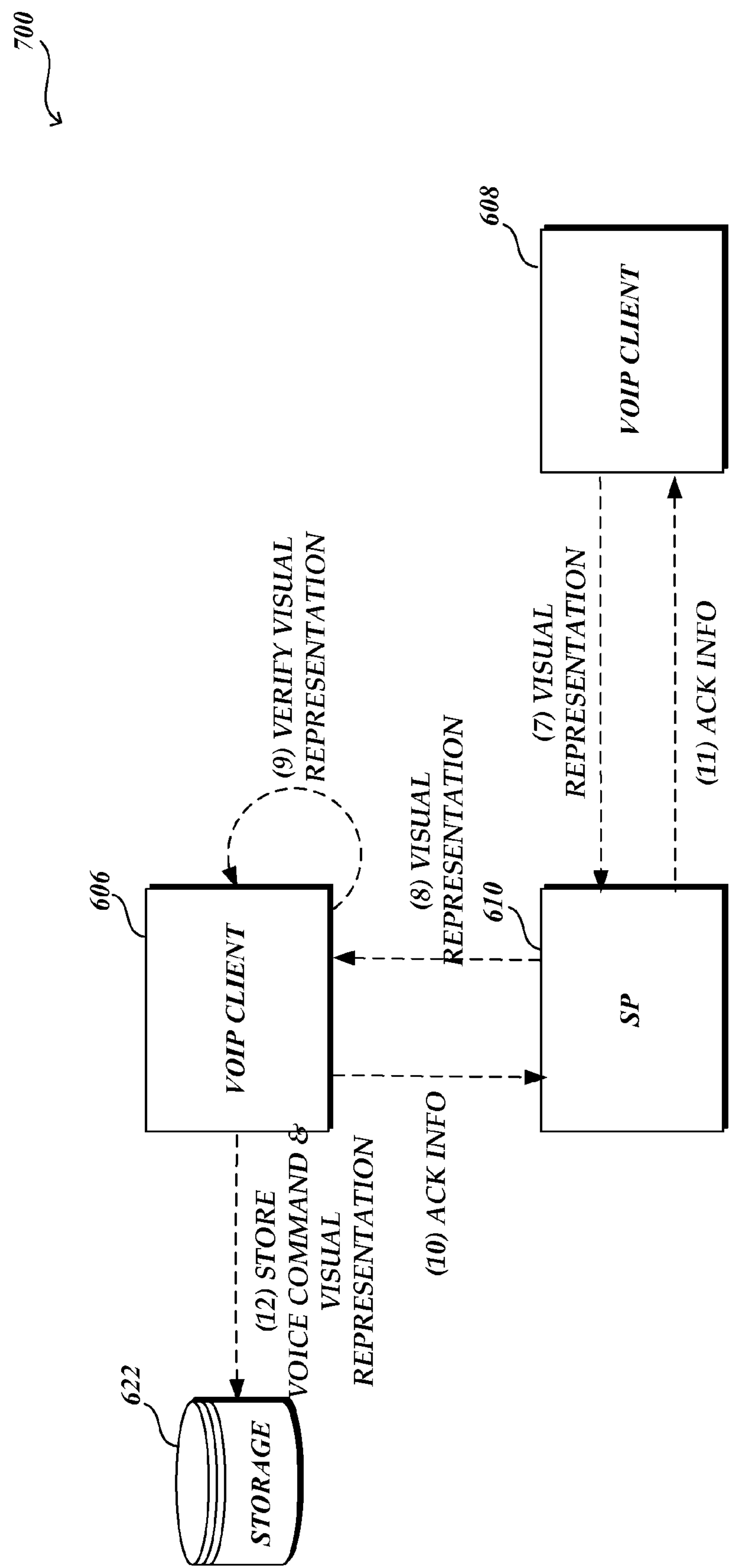

FIGS. 7A and 7B are block diagrams 700 illustrating interactions among several VoIP entities for generating and transferring a visual representation in order to verify accuracy of certain conversation data via a service provider in accordance with an embodiment of the present invention. The VoIP entities may include VoIP clients 606, 608, a VoIP service provider 610, and the like. While this example utilizes one VoIP service provider and two VoIP clients, any number and combination of VoIP clients and/or service providers may be used with embodiments of the present invention. It is also contemplated that collecting and transferring contextual information related to creating a visual representation can be done numerous times before, during, and/or at the end of the conversation. For the purpose of discussion, assume that VoIP Client 606 and VoIP Client 608 have established a conversation channel between devices of VoIP Client 606 and VoIP Client 608 via Service Provider (SP) 602.

Referring to FIG. 7A, during a conversation, VoIP Client 606 transmits voice commands which may in return require some form of representation regarding the accuracy of the transmitted commands. For example, a doctor places a medicine prescription for a patent to a pharmacy via a digital voice conversation. Before the doctor completes his prescription by transmitting his digital signature, it is necessary to make sure that the pharmacy has received the accurate information about the prescription. Upon receipt of a voice command for a medicine prescription, the pharmacy may transmit to the doctor a visual representation (e.g., a simple confirmation message summarizing the received voice command) of the received voice command while the doctor and the pharmacy are exchanging a digital voice conversation. If the visual representation indicates that the prescription order is accurately placed, the doctor may complete his prescription by transmitting verification of the visual representation. For example, the doctor can respond to say "yes, the order is correct," send a verification message along with his digital signature, or the like. If the visual representation indicates that the prescription order is not accurately placed, the doctor may request to correct the inaccuracy. After the pharmacy changes the prescription based on the request, a second visual representation including the changes will be transmitted to the doctor for verification. In this manner, several visual representations and corresponding responses may be exchanged between the doctor and the pharmacy until the accuracy of the prescription order is confirmed by the doctor.

In an illustrative embodiment, VoIP Client 606 may collect contextual information relating to a set of rules which specify what format, content, etc., should be included in a visual representation in response to the voice command. VoIP Client 606 further identifies structured hierarchies that will be used to carry the contextual information related to the visual representation. The collected contextual information is transmitted from VoIP Client 606 to SP 602. Upon receipt of the contextual information, SP 602 may store part or all of the received contextual information and may collect more contextual information, if necessary. A set of rules about a confirmation in a conversation via a visual representation may be provided by an authorized third party. SP 602 also updates the received contextual information. For example, a hospital that the doctor is affiliated with has specified with SP 602 a set of rules governing the processing of verbal prescriptions. In this example, SP 602 may identify the set of rules specified by the hospital and add the set of rules to the received contextual information.

As will be appreciated by one of ordinary skill in the art, SP 602 will have logic to consolidate any conflict between the two sets of rules. Further, SP 602 may add information relating to services provided for VoIP Client 608. In addition, the information regarding the identified structured hierarchies is also transmitted from VoIP Client 606 to SP 602. As will be discussed in greater detail below, the information regarding the identified structured hierarchy may include information about which structured hierarchies are used to carry the corresponding contextual information, how to identify the structured hierarchies, and the like.

SP 602 transmits the contextual information relating to the visual representation to VoIP Client 608. SP 602 also transmits information of the corresponding structural hierarchies. VoIP Client 608 may identify a set of rules defining how to process the contextual information upon receipt of the contextual information. In one embodiment, VoIP Client 608 may have a predefined set of rules defining how to process the contextual information for each device of VoIP Client 608. Based on the set of rules, VoIP Client 608 may process the contextual information and extract a set of confirmation rules from the processed contextual information. Subsequently, VoIP Client 608 generates the visual representation to verify the accuracy of a voice command in accordance with the set of confirmation rules. The generated visual representation and the associated voice command may be stored in local storage 620 of one of devices of VoIP Client 608 for future reference.

Referring back to the verbal prescription example, the doctor may want to confirm the prescription information including a medicine name, patient name, patient identification number, prescribed dosages, etc., before completing the verbal prescription. In order to quickly verify the accuracy of the verbal prescription, a simple text message without any graphic component may be preferred. The doctor's preference may have been transmitted as part of contextual information. Alternatively, the pharmacy may previously have received preference information, or a service provider may provide such information. The pharmacy will generate the text message, including the prescription information, which the pharmacy extracted from the verbal prescription (voice data).

After generating the visual representation, as shown in FIG. 7B, VoIP Client 608 transmits the visual representation to VoIP Client 606 via SP 610. Upon receipt of the visual representation, VoIP Client 606 verifies whether the visual representation accurately reflects the voice command. If the visual representation does not reflect the correct information, VoIP Client 606 may send a negative acknowledgement (ACK) as a response to the visual representation. In this scenario, VoIP Client 606 may also send correction information or transmit another voice command to VoIP Client 608. If the visual representation accurately reflects the voice command, VoIP Client 606 may send a positive ACK (or verification of the visual representation) as a response to the visual representation. The positive ACK may be voice data, simple text data, any suitable visual data, or the like. In one embodiment, the positive ACK may include a digital signature, authorization, or the like and be utilized to complete the voice command. As described above in the example, after the doctor verifies the visual representation as to whether the correct prescription has received by the pharmacy, a digital signature for the prescription may be sent to the pharmacy to complete the verbal prescription.

Referring to FIG. 8, an exemplary screen 650 displays a visual representation in accordance with embodiments of the present invention. Assume that a hospital where the doctor is affiliated has a set of hospital rules specifying that for the verbal prescription, a visual representation is to be generated in a specific form such as a prescription label. Further assume that the pharmacy has previously obtained the set of hospital rules. In response to a verbal prescription, the pharmacy generates a prescription label based on the verbal prescription order as a visual representation and transmits the prescription label to the doctor. In this example, when the prescription label is displayed on a device of the doctor, a user interface 652 (e.g., YES/NO Check Box, etc.) may be provided for the verification as illustrated in FIG. 8. Through the user interface 652, the doctor can indicate that the label (visual representation) is accurate.

As discussed above, the information regarding the identified structured hierarchies corresponding to the contextual information may be received by VoIP Client 608. Upon receipt of the information regarding the identified structured hierarchies, VoIP Client 608 may look up predefined structured hierarchies to select the identified structured hierarchies for the contextual information. In one embodiment, the structured hierarchies may be defined by XML. However, it is to be appreciated that the structured hierarchies can be defined by any language suitable for implementing and maintaining extensible structured hierarchies. Generally described, XML is well known as a cross-platform, software and hardware independent tool for transmitting information. Further, XML maintains its data as a hierarchically structured tree of nodes, each node comprising a tag that may contain descriptive attributes. XML is also well known for its ability to allow extendable (i.e., vendor customizable) patterns that may be dictated by the underlying data being described without losing interoperability. Typically, an XML namespace URI is provided to uniquely identify a namespace. In some instances, the namespace may be used as a pointer to a centralized location containing default information (e.g., XML Schema) about the document type the XML is describing.

In an illustrative embodiment, VoIP Client 606 may identify an XML namespace for contextual information. When multiple contexts are aggregated, an appropriate XML namespaces can be declared as an attribute at the corresponding tags. It is to be understood that XML namespaces, attributes, and classes illustrated herein are provided merely as an example of structured hierarchies used in conjunction with various embodiments of the present invention. After VoIP Client 608 receives the XML namespace information, the VoIP Client 606 transmits a set of data packets containing contextual information defined in accordance with the identified XML namespace or namespaces to VoIP Client 608. When a namespace is present at a tag, its child elements share the same namespace in pursuant to the XML scope rule defined by the XML 1.0 specification. As such, VoIP Client 608 and VoIP Client 606 can transmit contextual information without including prefixes in all the child elements, thereby reducing the amount of data packets transmitted for the contextual information.

Figure 9A:
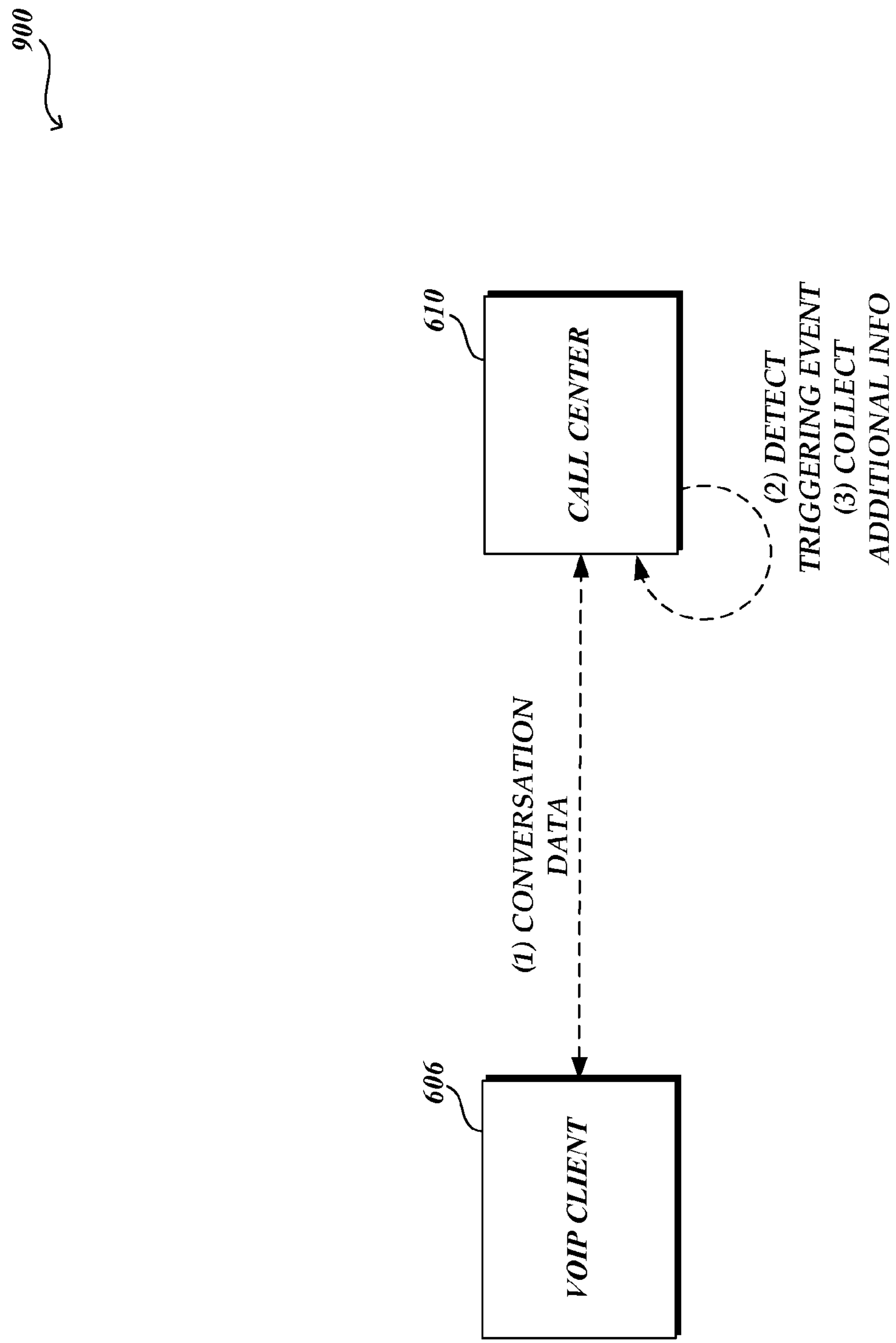
FIGS. 9A-9C are block diagrams illustrating interactions between a client and a call center for verifying accuracy of part of conversation in accordance with an aspect of the present invention.
Figure 9B:
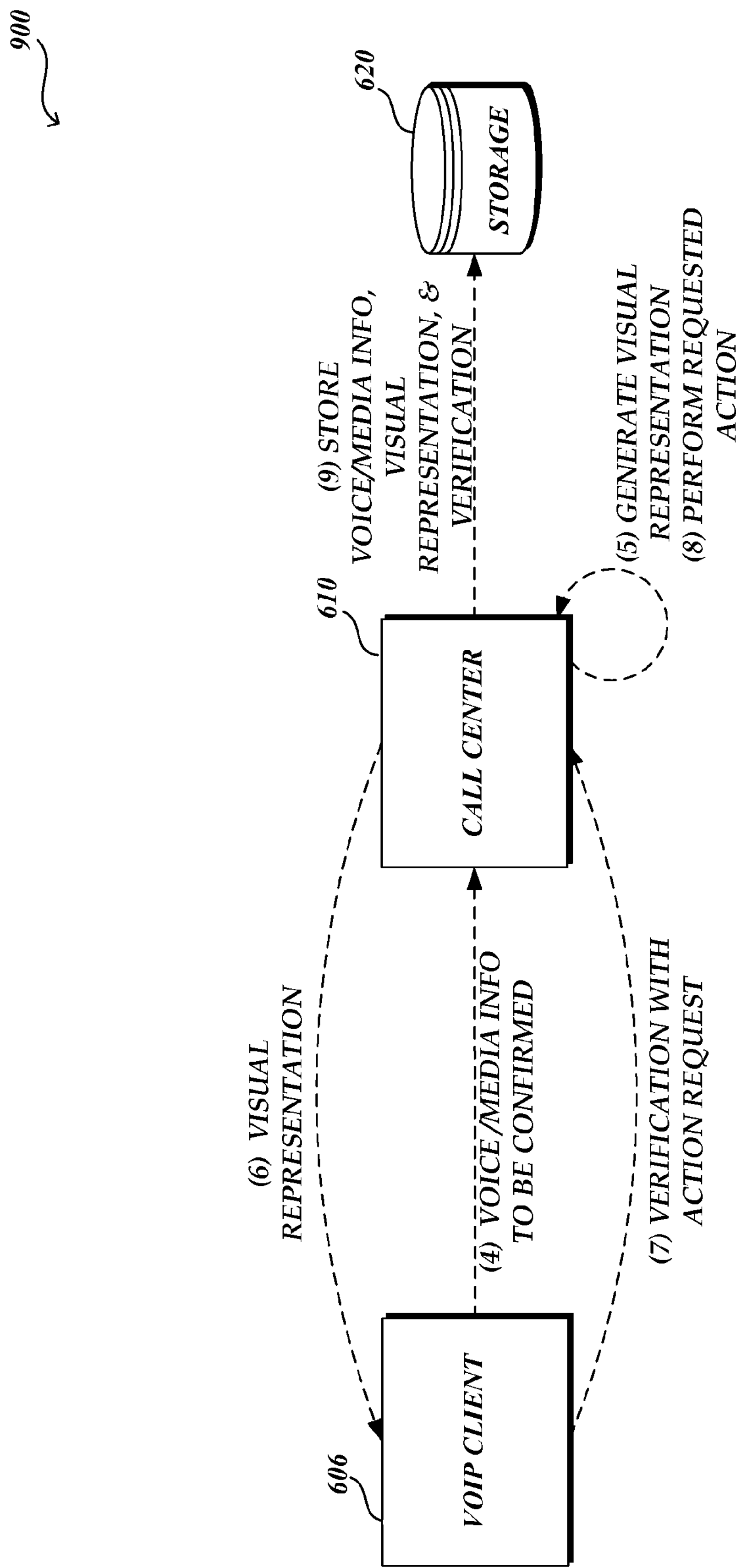
Figure 9C:
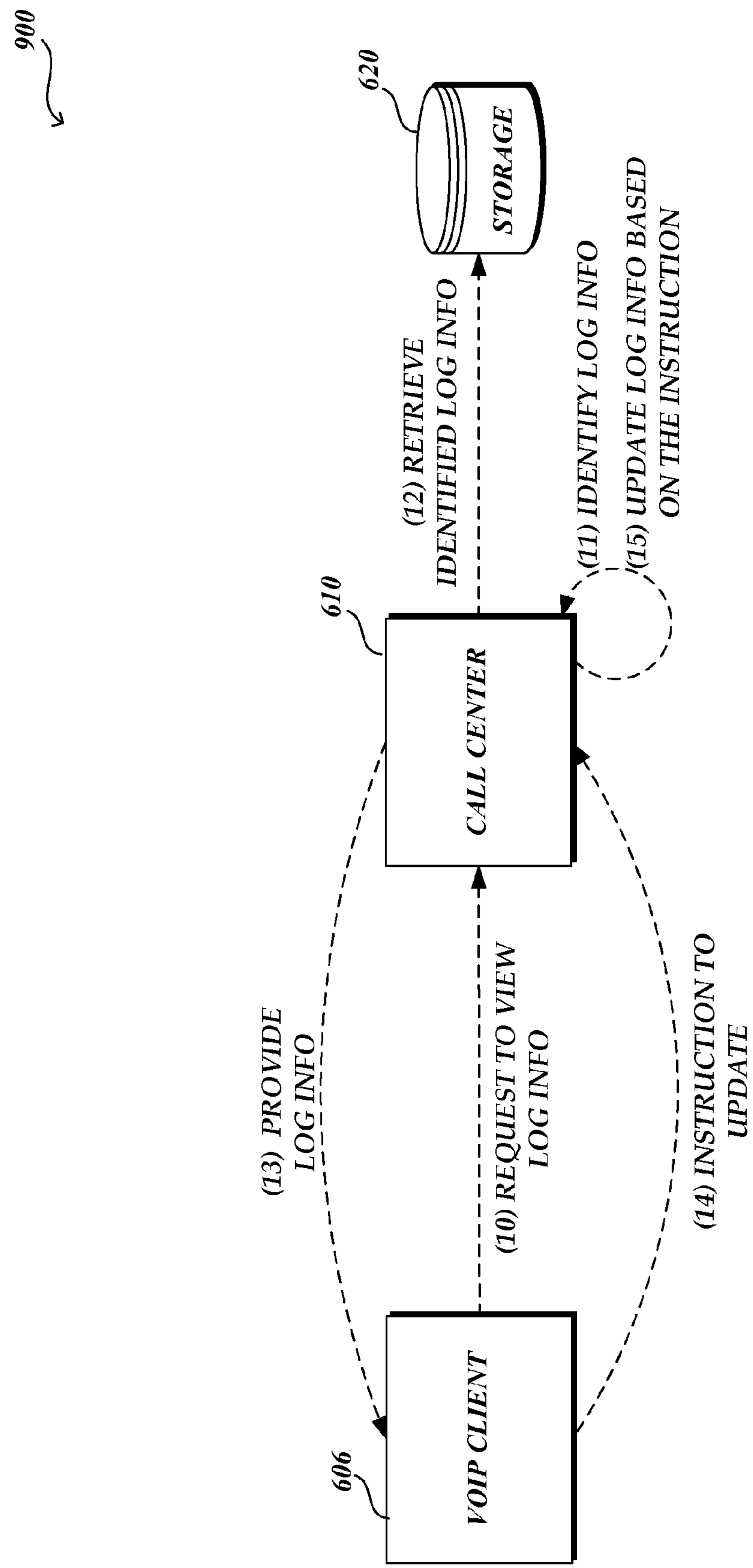

FIGS. 9A-9C are block diagrams 800 illustrating interactions between a VoIP client and a call center for exchanging visual representations and responses to the visual representations regarding conversation data in accordance with embodiments of the present invention. For the purpose of discussion, assume that VoIP Client 606 and a contact of a call center 610 have established a VoIP communication channel for e-commerce transactions. It is to be understood that the contact of a call center can be a human agent, an interactive voice recognition system (IVRS), or the like. It is further to be understood that the conversation data is parsed into words which are suitable for interactive voice recognition.

Referring to FIG. 9A, during a conversation, the call center 610 may detect a triggering event to generate a visual representation (e.g., confirmation message, etc.) for part of the conversation. The triggering event may be detected when voice command keywords (e.g., "generate a confirmation," "place a purchase order," etc.) are recognized, a confirmation request (e.g., contextual information) is received, etc. Additionally, the triggering event may be one of the predefined events such as a verbal purchase transaction, a verbal reservation, a verbal agreement, a verbal task assignment, etc., which will require a visual representation for a conversation during that event. Upon detection of the triggering event, the call center will collect and/or obtain any additional information necessary to generate a visual representation of a conversation. In one embodiment, based on the detected triggering event or the needs of the parties engaging in a conversation, different types of visual representations and corresponding confirmations/responses may need to be exchanged. For example, VoIP Client 606 may request a visual representation for a verbal purchase transaction while the call center may request a simple acknowledgement of receipt for a disclaimer read to VoIP Client 606. Moreover, the call center may request credit card number information as a response to the visual representation, if VoIP Client 606 verifies that the visual representation is consistent with the verbal purchase order.

In an illustrative embodiment, the call center 610 may have a set of confirmation rules to generate a visual representation for confirming part of a conversation. For example, a purchasing order form may be used in generating a visual representation of a verbal purchase transaction. Within the form, a request to verify the visual representation may be included and, thus, may lead to the next round of a confirmation/response exchange.

As shown in FIG. 9B, VoIP Client 606 and the call center 610 exchange voice/media information (as part of a conversation) which is to be confirmed based on the set of rules of the call center. For the purpose of discussion, assume that the exchanged voice/media information is a verbal purchase order and the call center has a set of rules specifying that a text message type visual representation is to be generated in response to a verbal purchase order. After the verbal purchase order is received, a visual representation of the verbal purchase order is generated based on the set of rules and transmitted to VoIP Client 606. After VoIP Client 606 verifies whether the verbal purchase order was accurately received by the call center, an appropriate response to the visual representation will be transmitted to the call center 610. If the response is a verification of accuracy in the visual representation, the call center may store log information including, but not limited to, the verbal purchase order (voice/media information), the visual representation sent from the call center, the verification of the visual representation, and/or date/time information.

In one embodiment, an action request may also be transmitted along with a visual representation or a response to a visual representation. For example, VoIP Client 606 may send a verification of the visual representation in conjunction with an instruction to perform a purchase transaction using credit card information which was used in a previous purchase transaction. For yet another example, VoIP Client 606 may send a verification of the visual representation in conjunction with a request for an invoice of the verbal purchase order.

In an illustrative embodiment, VoIP Client 606 may view or edit the stored log information relating to the exchanged voice/media information. As shown in FIG. 9C, after VoIP Client 606 sends a request (e.g., a voice command) to obtain the log information relating to the purchase order, the call center 610 identifies the log information relating to the purchase order and retrieves the log information from local storage. VoIP Client 606 can review the log information by replaying the stored voice/media information, viewing the visual representation and/or the verification. If necessary, VoIP Client 606 may instruct the call center to update the visual representation of the purchase order. For example, VoIP Client 606 may want to edit the purchase order with a new shipping address. The call center may update the log information based on the instruction.

It is to be understood that, although the examples discussed in FIGS. 7A-9C are generally focused on a visual representation for determining accuracy in part of a conversation, the examples are described for illustrative purposes and thus should not be construed as limiting.

In one embodiment, a visual representation may be generated to be a verbatim transcript of a conversation and thus each client can read the previously exchanged content. After mutual confirmations, the verbatim transcript may be stored for the record. In another embodiment, part of a conversation can be converted as an action task in a workflow. For example, as a manager instructs or requests some tasks during a conversation with an employee, a visual representation for the part of the conversation relating to a task may be generated and transmitted from the employee to the manager. The manager verifies whether the task (visual representation) includes accurate information and then transmits the proper response to the employee. If the employee receives verification of the task, the task may be stored as a part of the employee's workflow. In one embodiment, after the manager instructs or requests tasks during a conversation with an employee, the tasks are automatically generated in a workflow of the team (or the employee) and the manager and the employee can view or edit the generated task. In this embodiment, a notification of a visual representation may be sent to the manager as a simple message, for example, "a task is generated, please confirm," etc. Upon receipt of the notification, the manager may verify that the task assigned to the employee is accurately generated in the workflow. As will be appreciated by one of ordinary skill in the art, various entries in a calendar, e-mail, to-do list, etc., may also be updated to reflect the generated task.

In yet another embodiment, several visual representations for part of a conversation may be generated for several clients engaging in a multi-party conversation. In this embodiment, a visual representation may include an identification of a client (sending client) who generates the visual representation and an identification of a client (receiving client) who is to receive the visual representation. In some instances, one or more visual representations for the same part of a conversation may be generated by multiple sending clients. Likewise, one or more responses to a visual representation may be received by a single sending client who has generated the visual representation.

Moreover, it is contemplated that one visual representation can be circulated from one client to a next client among a particular group of clients. In this scenario, a client who receives the visual representation may attach verification (approval) to the visual representation, determine a next client to approve the visual representation and pass it to the determined next client. Eventually, the visual representation is approved by a group of people in a desired order and returned to the client who initially generated the visual representation. For example, a group of people are discussing a project agenda and come up with a generally agreed upon agenda. A project leader generates a visual representation of the conversation (decision) and circulates the visual representation among project team members for their approval.

It is also contemplated that a visual representation can include a translation of the confirmed conversation in a preferred language of a client. For example, a client who is comfortable reading Spanish rather than English may specify Spanish as a preferred language. When part of a conversation needs to be confirmed, a visual representation for that part of the conversation may be generated in Spanish or a visual representation in English may be generated and then translated in Spanish via translator software or intermediary language service providers. In this manner, a visual representation in Spanish can be provided to the client who specified Spanish as the preferred language.

Figure 10:
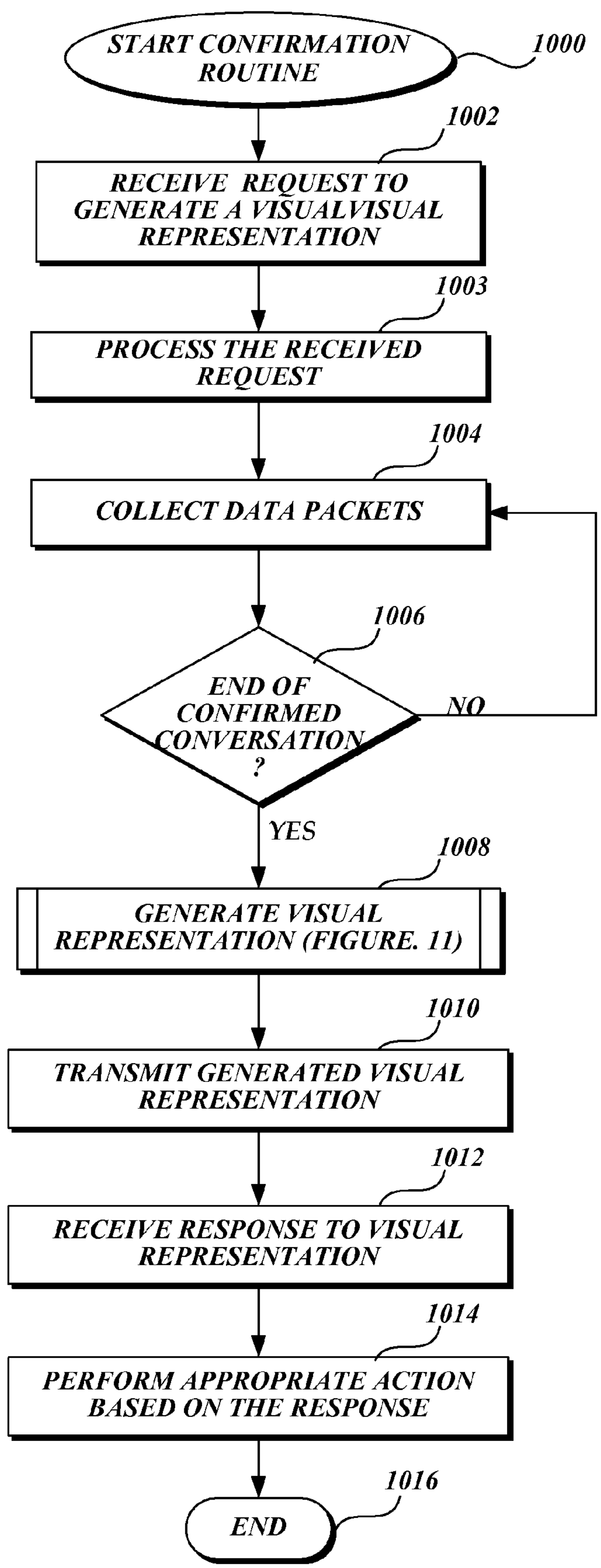
FIG. 10 is a flow diagram illustrating a confirmation routine for providing a visual representation of the received conversation data in accordance with embodiments of the present invention.

Referring now to FIG. 10, a flow diagram of a confirmation routine 1000 is depicted in accordance with an embodiment of the present invention. For the purpose of discussion, assume that VoIP devices of several clients have an established communication channel and exchange a VoIP conversation over the communication channel. At some point during establishment of a digital voice conversation, or at any time thereafter, a request (a confirmation request) to confirm at least a portion of the VoIP conversation may be received by one or more of the VoIP client devices, as illustrated by block 1002.

As discussed above, a confirmation request may be automatically generated based on previously obtained contextual information that includes a set of rules specifying triggering events. For example, a hospital may have specified a set of rules that specify when a doctor or a nurse makes a call to a pharmacist to order a verbal prescription, at least one visual representation of the verbal prescription is to be generated and verified for accuracy by the doctor or the nurse. In this example, the set of rules may be transmitted from a device of a client (e.g., a doctor or a nurse) to a device of another client (e.g., a pharmacy) as part of contextual information. It is to be understood that if clients have previously exchanged a set of rules related to a visual representation, the previously obtained set of rules may be utilized.

Alternatively, a confirmation request may be received as active input from one of the clients involved in the VoIP conversation or from a third party monitoring the VoIP conversation. For example, the client may use a device that is equipped with a button for requesting a visual representation of the VoIP conversation and sending verification in response to a received visual representation. Similarly, a graphical user interface (GUI) may be provided to the client with menu options, allowing the client to choose one option to request a visual representation.

At block 1003, the confirmation request may be processed. At block 1004, a set of data packets (i.e., a portion of the VoIP conversation) is collected. The set of data packets may include voice data packets and/or media data packets. At decision block 1006, a determination is made as to whether the portion of the VoIP conversation to be confirmed (hereinafter, "confirmed conversation") is ended. For example, each client can indicate the ending of the confirmed conversation by various inputs (transmitted as part of contextual information) from a device, voice commands, or the like. As will be readily appreciated, after the end of the confirmed conversation, the clients may continue exchanging the VoIP conversation. If it is determined at decision block 1006 that the confirmed conversation is not ended, the routine 1000 proceeds to block 1004 where the data packets are collected. The routine 1000 repeats the above mentioned steps until the confirmed conversation is ended.

If it is determined at decision block 1006 that the confirmed conversation is ended, at block 1008 a visual representation generating subroutine 1100 returns a visual representation corresponding to the confirmed conversation. At block 1010, the generated visual representation is transmitted to the VoIP clients. The generated visual representation may be transmitted to only the VoIP client who has requested the visual representation or transmitted to all VoIP clients who are currently engaged in the VoIP conversation. At block 1012, a response to the visual representation is received. As described above, the response may be a simple acknowledgement of receipt, verification of the visual representation, a request for another visual representation, a request for an action, etc.

At block 1014, an appropriate action may be performed based on the response. For example, if the recipient VoIP clients send responses indicating that the visual representation is verified, the collected data, visual representation, response, etc., may be stored in local storage. Other relevant information such as participating client names, time/date information, the subject of the confirmed conversation, etc., may also be stored. In another example, if the VoIP clients send responses indicating that the received visual representation is not consistent with the confirmed conversation, the correct information may be collected from the VoIP clients or extracted from the collected data. Based on the correct information, a second visual representation may be generated and transmitted to the recipient VoIP clients. It is to be understood that several visual representations and responses may be exchanged. For yet another example, if the VoIP clients send digital signatures as responses in order to verify the confirmed conversation, the visual representation may be an authenticated agreement corresponding to the confirmed conversation.

As described above, the confirmed conversation may be a group decision or a group agreement requiring collaborative confirmations from a group of people. For example, a visual representation can be circulated from one client to a next client among a particular group of clients. In this scenario, a client who receives the visual representation may attach verification (approval) to the visual representation and add additional information (authentication information, more decisions to be approved, suggestions, etc.) to the visual representation, determine a next client to approve the visual representation and pass it to the determined next client. Eventually, the visual representation includes a collaborative agreement that is approved by a group of people and returned to the client who initially generated the visual representation. At block 1016, the routine 1000 completes.

Figure 11:
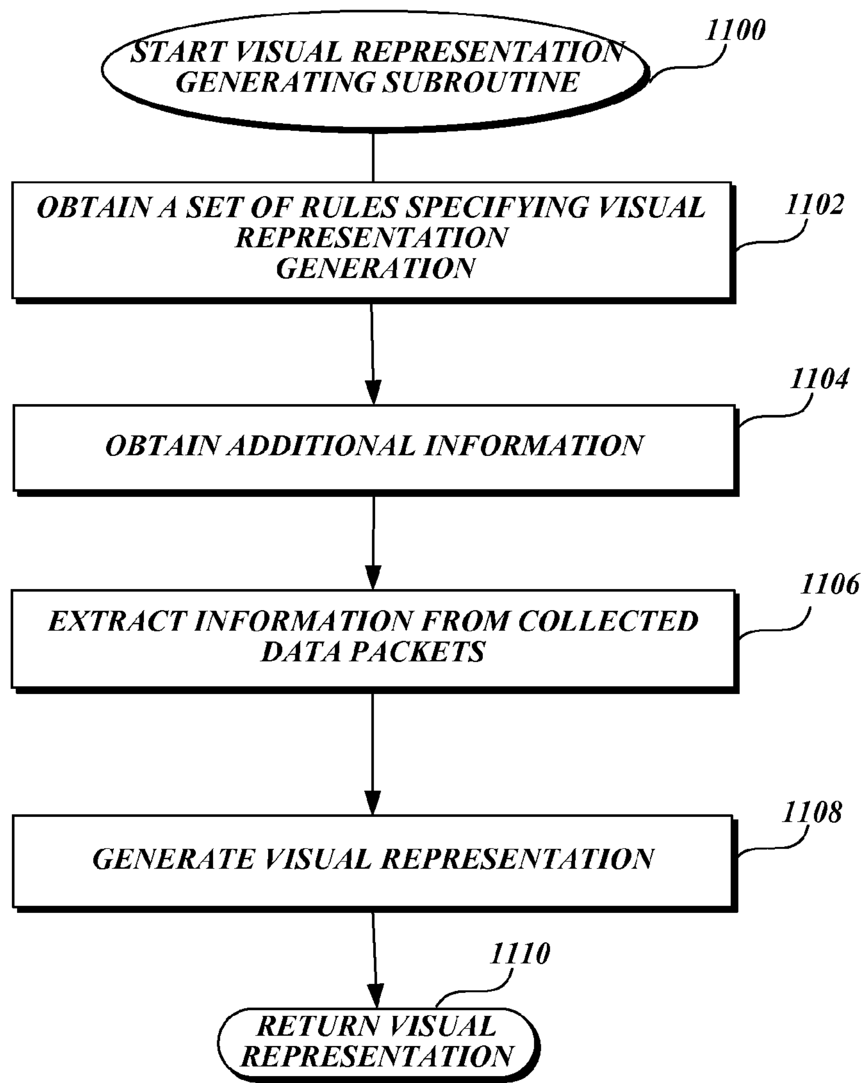
FIG. 11 is a flow diagram illustrating a visual representation generating subroutine utilized by the confirmation routine in FIG. 10 for generating a visual representation.

Referring to FIG. 11, a flow diagram of a visual representation generating subroutine 1100 is depicted in accordance with an embodiment of the present invention. After the confirmed conversation between VoIP clients is ended, at block 1102 a set of rules specifying generation of a visual representation may be obtained. A set of rules may be specified by any of the VoIP clients who requested a visual representation for the confirmed conversation. In addition, a service provider, an authorized third party, etc., can define triggering events which start generating a visual representation and specify a set of rules corresponding to each triggering event. At block 1104, additional information necessary to generate a visual representation may be obtained. For example, information about the VoIP clients who requested a visual representation, subject of the confirmed conversation, related matter number, related team name, related project name, workflow information, e-mail address, etc., may be obtained. At block 1106, information to be included in a visual representation may be extracted from the collected data packets. At block 1108 a visual representation is generated.

In one embodiment, the generated visual representation may include important keywords which are visually distinguished and can be modifiable by the receiving client. In this embodiment, the receiving client can send the updated visual representation back to the sending client after editing any incorrect information in the visual representation. The receiving client may also send one of the above discussed responses to the sending party after verifying whether the visual representation accurately represents the confirmed conversation. The subroutine 1100 returns the generated visual representation and completes at block 1110.

Figure 12:
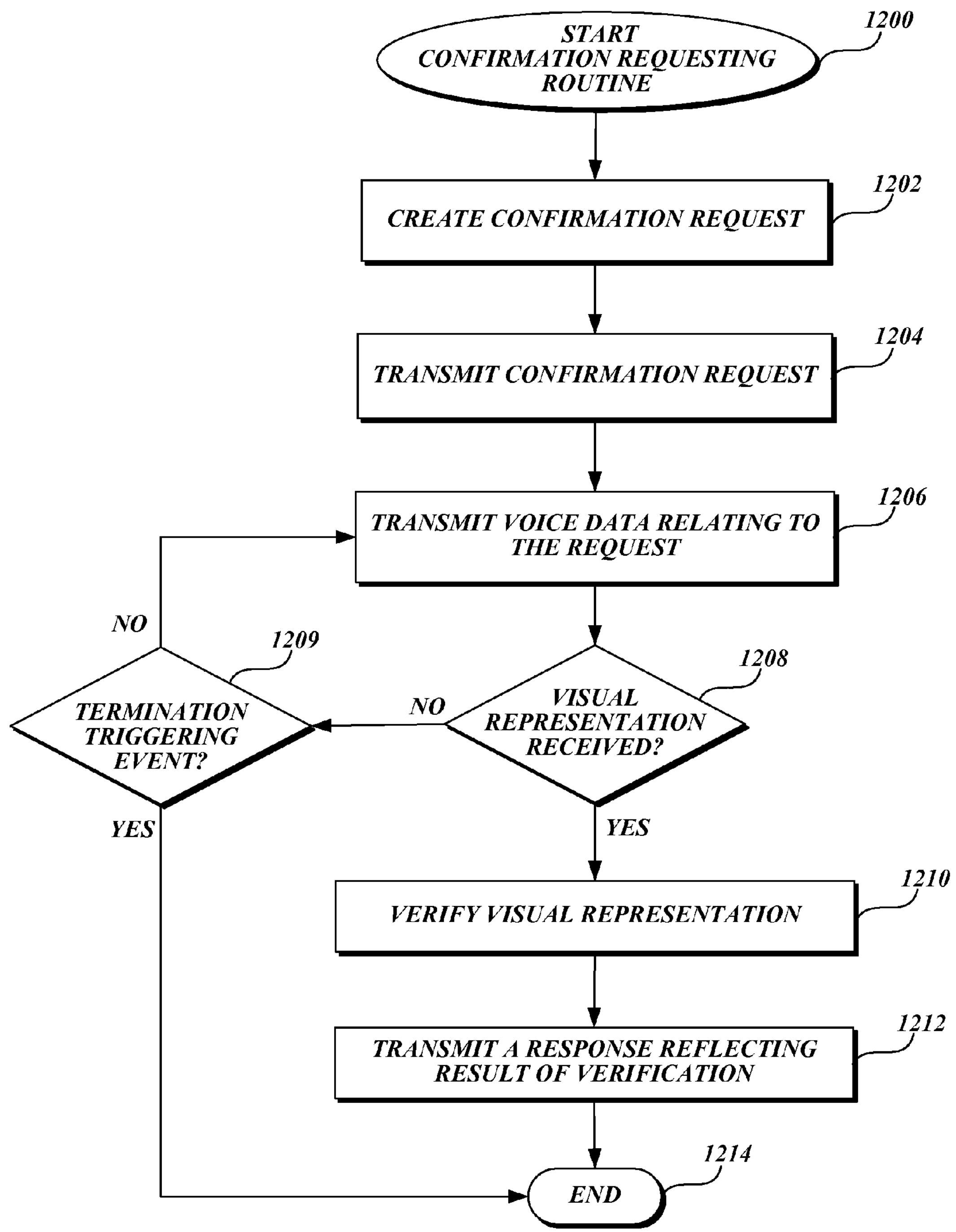
FIG. 12 is a flow diagram illustrating a confirmation requesting routine for transmitting a request for a visual representation and confirming whether the conversation is accurately represented in the visual representation in accordance with embodiments of the present invention.

Referring to FIG. 12, a flow diagram of a confirmation requesting routine 1200 is depicted in accordance with an embodiment of the present invention. As with FIG. 10, assume that VoIP devices of several clients have an established communication channel and exchange a VoIP conversation over the communication channel. At some point during establishment of the VoIP conversation, or at any time thereafter, a request to confirm (a confirmation request) at least a portion of the VoIP conversation may be created, as illustrated by block 1202. For example, a team manager plans a project and, during a VoIP conversation, assigns tasks to several people in a team. While the team manager is assigning tasks, the team manager wants to ensure that each team member understands the assigned tasks. In this scenario, the team manager may request a visual representation from each team member for the verbally assigned tasks. At block 1204 the confirmation request may be transmitted. At block 1206, voice data packets corresponding to a task may be transmitted. At decision block 1208, a determination is made as to whether a visual representation has been received for the transmitted voice data packets. If the visual representation corresponding to the transmitted voice data packets has not been received in a predetermined period, at decision block 1209 a determination is made as to whether any event is detected to trigger the termination of the visual representation process. In one embodiment, if the visual representation has not been received after a threshold number of attempts to retransmit the voice data, a VoIP device may generate a triggering event to terminate the visual representation process. Further, a party of the conversation can generate a triggering event by canceling the visual representation request.

If it is determined that any termination triggering event has not been detected, the routine 1200 will return to block 1206 and retransmit the voice data packets until the visual representation is received or a triggering event is detected. If the visual representation corresponding to the transmitted voice data packets has been received in a predetermined period, at block 1210 the visual representation may be verified whether the information in the confirmed conversation is correctly represented in the visual representation. At block 1212, the result of the verification process may be transmitted as a response.

For example, a request to edit the visual representation may be sent if the information in the confirmed conversation is not correctly represented in the visual representation. Additionally, the request may also indicate to generate a second visual representation which will reflect edits on the visual representation. For another example, verification of the accuracy of the visual representation may be sent if the information in the confirmed conversation is correctly represented in the visual representation. Returning back to the team manager example, in response to the task assignments, a visual representation corresponding to a certain task assignment may be received from a team member. The manager may verify whether the visual representation accurately represents the task assignments and transmit a response to the visual representation. If a team member receives verification (confirmation of the visual representation) from the team manager, an action task may be automatically generated in a workflow of the team member based on the visual representation. If a termination triggering event has been detected (at decision block 1209) or after transmitting the result of the verification process (at block 1212), the routine 1200 completes at block 1214. In one embodiment, when a termination triggering event is detected, a notification may be transmitted in order to inform the reason for the termination.

It is to be understood that the aforementioned examples are described for exemplary purposes. As mentioned above, several visual representations and responses (acknowledgement, verification, notification, action request, etc.) may be exchanged based on the needs of VoIP clients participating in the VoIP conversation.

It is contemplated that the visual representation of conversation can be redirected to a user device that is not currently engaging in a conversation. For example, assume a scenario where a manager is in an airport talking on a mobile phone. As a manager instructs or requests some tasks during a conversation with an employee, a visual representation for the part of the conversation relating to a task may be generated and transmitted from the employee to the manager. The manager may redirect the visual representation to a kiosk Personal Computer (PC) in the airport and receive the visual representation on the screen of the PC. Subsequently, the manager can verify whether the task (visual representation) includes accurate information and then transmits the proper response to the employee via the PC while continuing the conversation on the mobile phone.

With reference to FIGS. 13A-13E, block diagrams 800 illustrative of various classes and attributes of structured hierarchies corresponding to VoIP contextual information are shown. As mentioned above, structured hierarchies are predefined organizational structures for arranging contextual information to be exchanged between two or more VoIP devices. Structured hierarchies can be defined, updated, and/or modified by redefining various classes and attributes. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a Call Basics Class 802, a Call Contexts Class 810, a Device Type Class 820, a VoIP Client Class 830 and the like.

Figure 13A:
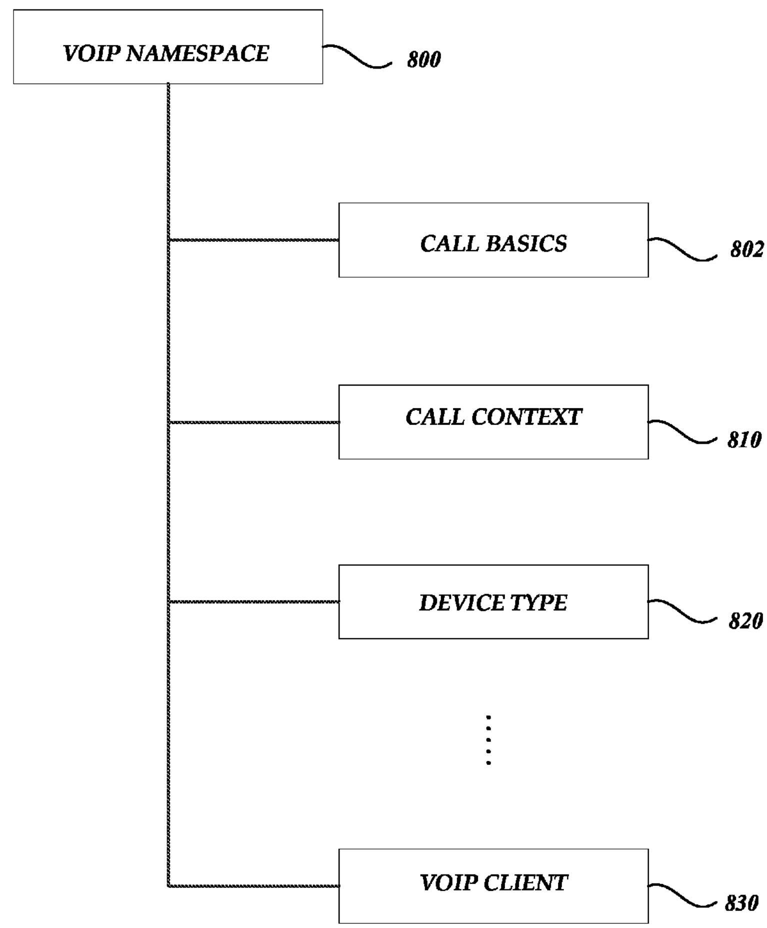
FIGS. 13A-13E are block diagrams illustrative of various attributes and classes of structured hierarchies corresponding to VoIP contextual information in accordance with an aspect of the present invention.
Figure 13B:
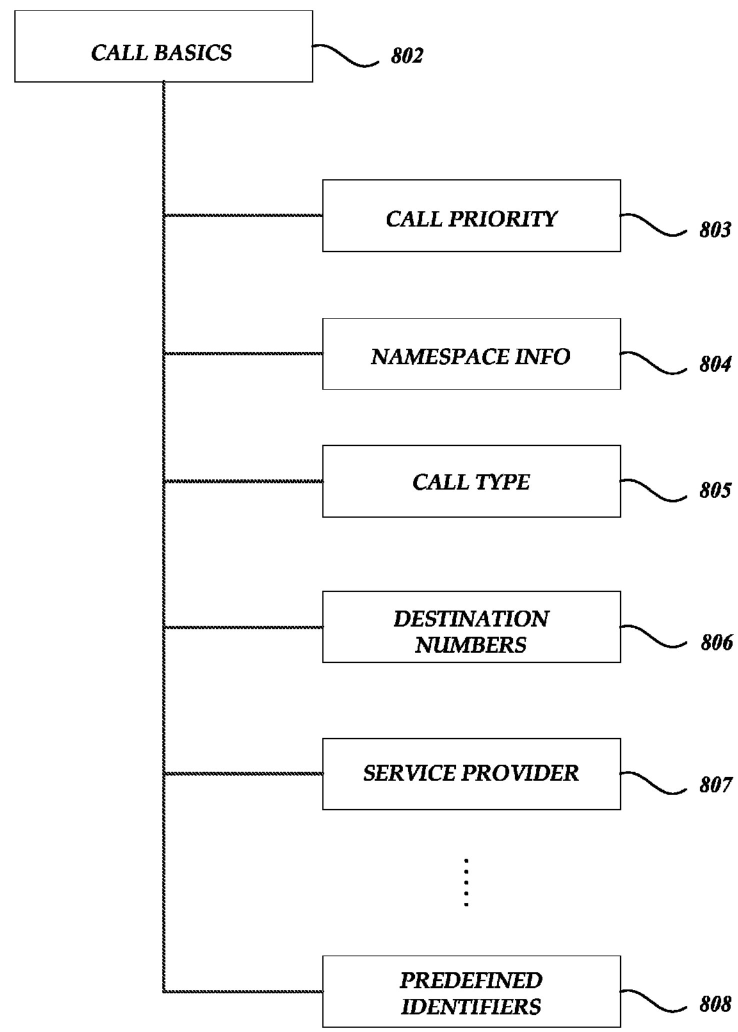

With reference to FIG. 13B, a block diagram of VoIP Namespace 800 illustrating subclasses of a Call Basics Class 802 is shown. In an illustrative embodiment, a Call Basics Class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's client ID number), destination numbers (e.g., callees' client ID numbers or telephone numbers), call connection time, VoIP service provider related information, and/or ISP related information such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah," "oops," "wow," etc.) and facial expressions in graphical symbols. In one embodiment, a Call Basics Class 802 may be defined as a subtree structure of a VoIP Namespace 800, which includes nodes such as call priority 803, namespace information 804, call type 805, destination numbers 806, service provider 807, predefined identifiers 808, and the like.

Figure 13C:
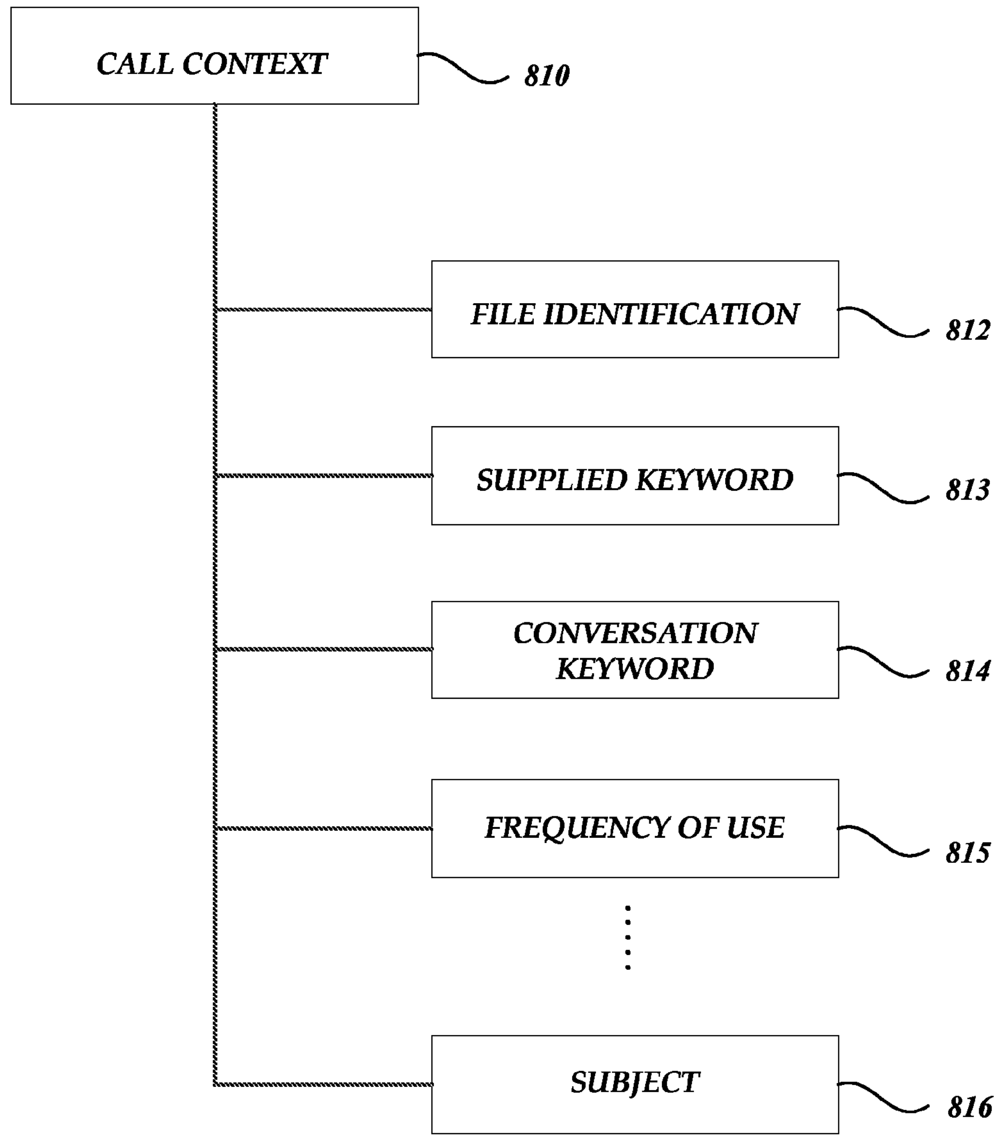

With reference to FIG. 13C, a block diagram of VoIP Namespace 800 illustrating subclasses of a Call Contexts Class 810 is shown. In one embodiment, a subset of VoIP contextual information relating to conversation context may correspond to the Call Contexts Class 810. The contextual information relating to conversation context may include information such as keywords supplied from a client, a service provider, a network, etc. The contextual information relating to conversation context may also include identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 810 may be defined as a subtree structure of a VoIP Namespace 800, which includes nodes corresponding to file identification 812, supplied keyword 813, conversation keyword 814, frequency of use 815, subject of the conversation 816, and the like.

Figure 13D:
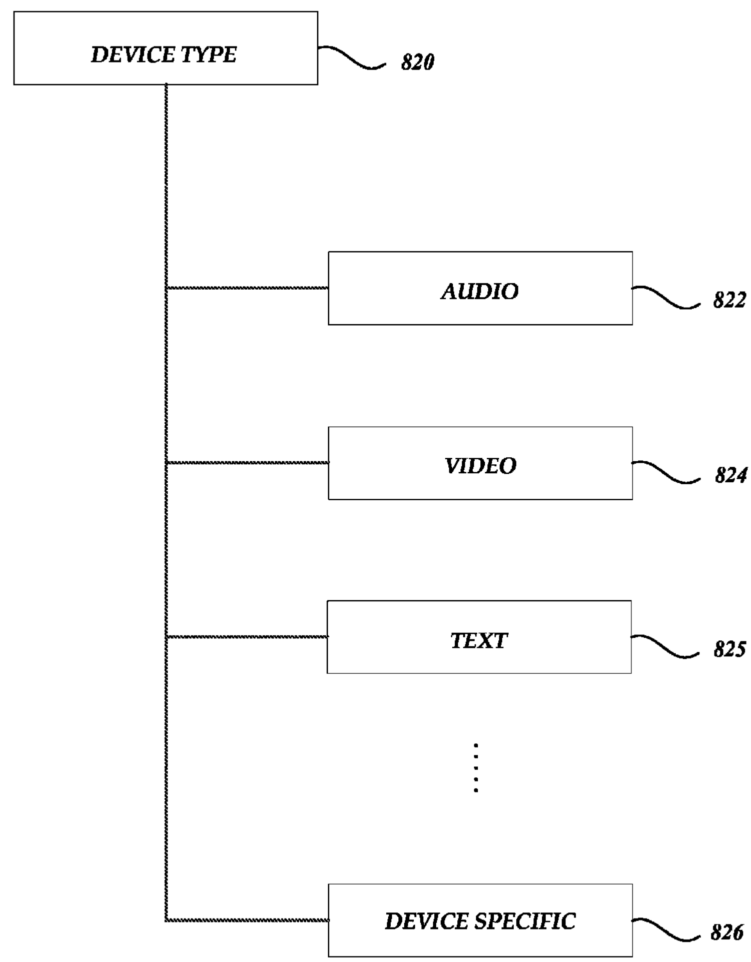

With reference to FIG. 13D, a block diagram of VoIP Namespace 800 illustrating subclasses of a Device Type Class 820 is depicted. In one embodiment, a Device Type Class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 820 may be defined as a subtree structure of a VoIP Namespace 800, which includes nodes corresponding to Audio 822, Video 824, Text 825, Device Specific 826 and the like.

Figure 13E:
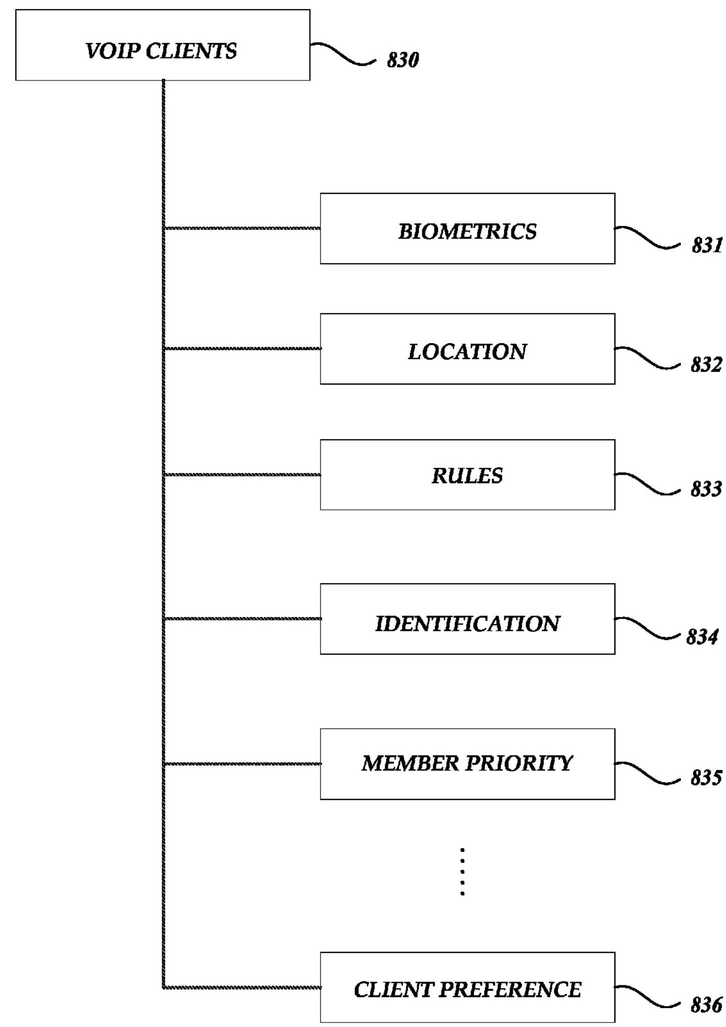

With reference to FIG. 13E, a block diagram of VoIP Namespace 800 illustrating subclasses of a VoIP Client Class 830 is depicted. In accordance with an illustrative embodiment, a VoIP Client Class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, a service provider, a network, etc., user preferences, digital rights management (DRM), a member rank of an individual user in an organization, priority associated with the member rank, and the like. The priority associated with the member rank may be used to assign priority to the client for a conference call. In one embodiment, a VoIP Client Class 830 may be defined as a subtree structure of a VoIP Namespace 800, which includes nodes corresponding to user biometrics 831, location 832, rules 833, user identification 834, member priority 835, client preference 836, and the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for providing confirmation corresponding to a portion of a digital voice conversation wherein a digital voice conversation is exchanged over a digital communication channel, comprising:

receiving contextual data packets over the digital voice conversation identifying a set of rules which specifies a visual representation used in verifying the digital voice conversation;

identifying a triggering event from a portion of received conversation data packets of the digital voice conversation, and when the triggering event is identified:

extracting information from a portion of received conversation data packets of the digital voice conversation based on the set of rules in response to a determination to confirm a portion of the digital voice conversation;

generating a visual representation for the extracted information in accordance with the set of rules, wherein the visual representation corresponds to the portion of the digital voice conversation; and transmitting the generated visual representation as part of contextual information over the digital voice conversation.

2. The method of claim 1, further comprising:

identifying contextual information which indicates that a visual representation of the extracted portion of the digital voice conversation is desired.

3. The method of claim 1, wherein identifying the triggering event comprises recognizing at least one keyword from the conversation data packets.

4. The method of claim 1, wherein the portion of a digital voice conversation is parsed into words which are suitable for interactive voice recognition.

5. The method of claim 1, wherein the portion of a digital voice conversation is a decision made by a group of clients and the generated visual representation is transmitted to the group of clients.

6. The method of claim 1, further comprising:

if a form is predefined to convey a visual representation, extracting information from the portion of the digital voice conversation and obtaining additional information in accordance with the form;

generating a visual representation in the form; and transmitting the visual representation.

7. The method of claim 1, further comprising:

receiving a response to the visual representation, wherein the response includes at least one of a verification of the visual representation, an instruction of an action, an acknowledgement of receipt of the visual representation, a notification as to the inaccuracy in the visual representation, or an edit request in the visual representation.

8. The method of claim 7, wherein the verification of the visual representation includes authentication.

9. The method of claim 8, wherein a tiered oral agreement may be generated based on the visual representation and the response.

10. The method of claim 8, further comprising:

storing the generated visual representation, the portion of the digital voice conversation, the response, and date/time information.

11. The method of claim 10, wherein the stored visual representation and the portion of the digital voice conversation are retrieved and provided upon a request to review the stored visual representation and the portion of the digital voice conversation.

12. A system for providing a representation message in a response to a voice command wherein the voice command is part of a digital conversation exchanged over a digital communication channel, the system comprising:

a communication interface component for receiving a voice command;

a processing component for identifying a set of rules from contextual information received over the digital voice conversation relating to the voice command and for parsing the voice command based on the set of rules;

a confirmation generating component for obtaining additional information relating to the digital conversation in response to detecting a triggering event from a portion of the digital conversation and generating a first confirmation message by including the extracted information and the additional information in response to a determination to confirm a portion of the digital conversation using a visual representation sent in the contextual information; and wherein the communication interface component transmits the first confirmation message as part of contextual information over the digital communication channel.

13. The system of claim 12, wherein the processing component associates the first confirmation message with the voice command and stores the first confirmation message and the associated voice command.

14. The system of claim 13, wherein the communication interface component receives a response to the visual representation.

15. The system of claim 14, wherein, in response to the received response, the confirmation generating component generates a second confirmation message with respect to the voice command and the communication interface component transmits the second confirmation message as part of contextual information over the digital conversation channel.

16. The system of claim 14, wherein in response to the received response, the confirmation generating component updates the first confirmation message and wherein the response includes corrections to the first confirmation message.

17. A method for verifying at least a portion of conversation while the first user device and a second user device and a third user device are engaged in a voice conversation, the method comprising:

generating a confirmation request as part of contextual information, wherein the confirmation request is to receive a visual representation on conversation data subsequent to the confirmation request;

transmitting a confirmation request and corresponding conversation data to the second user device and the third user device;

receiving a visual representation corresponding to a portion of the conversation data;

generating a response to the visual representation; and transmitting the response to the visual representation, wherein the visual representation and the response to the visual representation are part of contextual information exchanged over the digital voice conversation.

18. The method of claim 17 wherein generating a response includes verifying the visual representation with respect to the conversation data.

19. The method of claim 18 wherein the visual representation corresponding to the conversation data is received via a third user device which is suitable for presenting the visual representation.

20. The method of claim 18 wherein the visual representation is stored as part of workflow actions.

* * * * *